United States Patent [19]
Turro et al.

[11] 3,888,996
[45] June 10, 1975

[54] BAKERY FORMULATION CONTAINING NON-FAT DRY MILK SUBSTITUTE

[75] Inventors: Eugene J. Turro, Lombard; Endre F. Sipos, Elmhurst, both of Ill.

[73] Assignee: Central Soya Company, Inc., Fort Wayne, Ind.

[22] Filed: July 23, 1973

[21] Appl. No.: 381,857

[52] U.S. Cl. .............. 426/62; 426/21; 426/23; 426/25; 426/153
[51] Int. Cl. ........ A21d 2/36; A21d 2/26; A21d 2/22
[58] Field of Search ............ 426/62, 21, 23, 25, 19, 426/345, 153

[56] References Cited
UNITED STATES PATENTS

| | | | |
|---|---|---|---|
| 1,589,311 | 6/1926 | Hewitt | 426/62 X |
| 1,966,013 | 7/1934 | Konrue | 426/62 X |
| 2,149,682 | 3/1939 | Jorgensen | 426/19 X |
| 2,557,283 | 6/1951 | Hansen | 426/25 X |
| 3,304,183 | 2/1967 | Johnston et al. | 426/25 |
| 3,529,970 | 9/1970 | Turro | 426/153 X |
| 3,531,294 | 9/1970 | Glabau | 426/21 |
| 3,803,326 | 4/1974 | Craig et al. | 426/21 |
| 3,818,108 | 6/1974 | Morrison | 426/25 |

*Primary Examiner*—Joseph M. Golian
*Attorney, Agent, or Firm*—Dawson, Tilton, Fallon & Lungmus

[57] ABSTRACT

A bakery formulation useful as a substitute for at least a part of the nonfat dry milk normally included in bread and like bakery products which includes approximately 87-89 percent soy flour, 5-7 percent soy isolate, 0.2-0.5 percent ascorbic acid with the remainder being edible calcium salts of which at least 50 percent of the salts being calcium lactate.

1 Claim, No Drawings

BAKERY FORMULATION CONTAINING NON-FAT DRY MILK SUBSTITUTE

SUMMARY OF INVENTION

This invention constitutes an improvement on U.S. Pat. No. 3,529,970 which relates to a bakery formulation making use of soy protein concentrate and soy flour as a substitute for at least a part of the historically employed nonfat dry milk. In some systems using the prior art product, the dough exhibited poor mixing tolerance due to lack of buffering. This manifested itself as excessive amounts of carbon dioxide from the fermentation process, especially after the doughs were remixed. Nonfat dry milk usually has enough buffering to suppress gas formation during the all important 60 minutes when the dough underwent machining prior to entering the proof box. However, this would be self defeating inasmuch as the objective is to provide a substitute for nonfat dry milk. Further, although this problem can be partially remedied by reducing dough temperature and/or floor time, most bakeries do not want to alter their proven, timehonored methods of processing.

On the other hand, in many bakeries in the south and southwestern parts of the United States, the ambient temperature often reaches 110°F. which causes excessive yeast activity. This results in gas production that is difficult to control by the above mentioned methods. The doughs then become gassy and difficult to machine, especially at the divider level of the molder-panner. The dough tends to rip and tear, necessitating large amounts of dusting flour, opening of the sheeting rolls and many times even shutting down equipment for cleanup.

Another problem confronting some bakeries which have tried the prior art product and which had high absorbent requirements was the need for adding extra water whereas the bakers wished to replace nonfat dry milk without any formulation changes. This desire of straight additive replacement without altering shop conditions and formulations is quite prevalent in the industry.

Although bread contained the prior art additive had reasonably good crumb color, some very critical bakers objected to the slight "off-white" sheen of the crumb that occasionally had been experienced.

In replacing nonfat dry milk with soy flour, the nutritional aspects of bread are satisfied quite well as far as the protein is concerned. Adjustments of vitamin, primarily riboflavin, and calcium content, however, is necessary. Vitamin content can easily be regulated by the use of inexpensive tablets available on the market. Calcium content adjustment is more complicated without disregarding its implications on functionality.

The instant invention represents a new improved product and method to eliminate the cited shortcomings of the prior art additive. The inventive product and method of providing the same has universal application in both continuous and conventional systems as an economical functional and nutritious nonfat dry milk replacement. It can be used alone or in combination with whey solids without production problems. The resulting bread using this product is of excellent quality.

The additive provided by this invention possesses better absorptive characteristics than nonfat dry milk. Absorption required however is not excessive enough that fomulation changes are necessary, if not desired. Not only are these functional qualities achieved but further this is done with the added and unexpected advantage of being able to substantially reduce the protein content. For example, protein contents employed heretofore have been of the order of about 56 percent of the additive whereas according to the invention we can provide an additive that is at least functionally equal but uses only 52 percent of protein. When we speak of 56 percent in the prior art we refer specifically to the prior art additive of the above-mentioned patent. Although the mechanism by which the invention operates is imperfectly understood, it is believed that there is an advantageous coaction through the use of soy flour of the order of 87–89 percent, 5–7 percent soy isolate, 0.2–0.5 percent ascorbic acid with the remainder being edible calcium salts, i.e., minerals, of which at least 50 percent is calcium lactate.

DETAILED DESCRIPTION

The invention may be carried out in different types of bread formulation and baking conditions. The following is illustrative, however, for typical white bread production in the United States.

Formulation -- This formula for producing a first-quality loaf of white bread is typical of the formulation used in the commercial baking companies using the sponge and dough process.

| SPONGE | |
|---|---|
| | Grams or lbs. |
| Flour | 552 |
| Water | 314 |
| Yeast | 23 |
| Yeast food | 4 |
| Mono-calcium phosphate | 2 |
| DOUGH | |
| Flour | 298 |
| Water, absorption variable. | |
| Sugar | 68 |
| NFDM or substitute | 25.5 |
| Shortening | 25.5 |
| Salt | 18 |
| Monoglycerides | 4 |

A typical second-quality formula is as follows:

| SPONGE | |
|---|---|
| | Grams or lbs. |
| Flour | 552 |
| Water | 314 |
| Yeast | 19 |
| Yeast food | 4 |
| Mono-calcium phosphate | 2 |
| DOUGH | |
| Flour | 298 |
| Water, absorption variable. | |
| Sugar | 42.5 |
| NFDM or substitute | 17 |
| Shortening | 13 |
| Monoglycerides | 4 |

The foregoing represent typical formulations using the normal bread ingredients; flour, water, sugar, shortening and yeast. Certain breads and cakes may use chemical leavening agents in place of the yeast.

A comparison of the formulations of a first-quality and second-quality loaf is as follows:

|  | 1st quality | 2nd quality |
| --- | --- | --- |
| Sugar | 8% or 68 grams or lbs. | 5% or 42.5 grams or lbs. |
| NFDM or substitute | 3% or 25.5 grams or lbs. | 2% or 17.0 grams or lbs. |
| Shortening | do. | do. |
| Yeast | 2.7 or 23.0 grams or lbs. | 2.23% or 19.0 grams or lbs. |

NOTE:
Above percentages and weights are based on the weight of the flour.

Proof time -- The proof time is the amount of time the moulded dough requires to expand to the desired size prior to baking. This is perhaps the most critical time in the production of bread, since proof time governs the speed of all baking equipment. If a dough requires an excessive amount of time to proof, the make-up equipment must be slowed down or even shut down completely. Therefore, in our studies accurate proof times were recorded to determine if the soy protein products would increase or decrease proofing time.

Bake -- The dough was scaled at 19 ounces to produce a loaf of bread with a finished baked weight of 16 ounces. The bake time was set at 18 minutes and the oven temperature was set at 425°F.

Bread cooling -- In commercial baking, the bread is cooled either on racks or in overhead cooling conveyors for a minimum of 60 to 80 minutes before the bread is sliced and wrapped. In the laboratory the bread was cooled for 60 minutes before it was checked for volume by the rapeseed displacement method.

Loaf size -- The one-pound loaf or bread produced by the commercial baker should be in the range of 4½ to 4¾ inches in height. When loaves of bread are too large, the bakery has difficulty in slicing, and many loaves of bread are crippled. If the oversized loaf can be successfully sliced, the problem then is to wrap the sliced bread. Currently, the wrap used in the bakery is either waxed paper or polypropylene film (both expensive). The oversized loaf cannot be wrapped in the standard cut of the wrapping material, therefore, more of the wrapping material is needed per loaf. For this reason, we endeavored to produce all the bread to conform with the size required by the bakery; 4½ to 4¾ inches in height. Loaves of bread that were larger than this size and whose rapeseed displacement was greater than the standard, were substantially downgraded. The standard used in the laboratory was determined by the actual measurement and rapeseed displacement of one-pound loaves of bread produced by commercial bakers in the Chicago area.

It will be noted that the foregoing formulation corresponds to that set forth in the above-identified Patent 3,529,970 and constitutes a conventional procedure in the baking of bread and in which the new product was used.

The new product is a specially processed soy flour (including soy protein isolate) to which have been added certain functional and nutritional additives which improved the buffering and mixing properties of the dough system. The food additives include calcium lactate, calcium sulfate and ascorbic acid. The average protein content of the soy product approximates 52 percent.

The Federal Bread Standards permit the use of the new soy product up to a level of 3 percent without requiring its declaration on the label. The major component is soy flour protein and the other food ingredients are present at levels that are well within the permissible amounts established by the Bread Standards.

A specific example of the inventive additive which was used in the foregoing procedure is as follows:

| Ingredient | Percentage |
| --- | --- |
| Soy flour having a nitrogen solubility index of not less than 66% | 88 |
| Soy protein isolate | 6 |
| Calcium lactate | 3 |
| Calcium sulfate | 2.75 |
| Ascorbic acid | 0.25 |

Soy protein isolate as defined by the National Soya Processors Association is a protein product obtained from clean dehulled, defatted soy beans having at least 90 percent protein (Nx 6.25).

The farinograph pattern clearly shows the functionality of the new product when compared to NFDM at the 3 percent level based on flour.

| Ingredient | Farinograph Pattern | | | | Mixing Tolerance Index | Absorption to 14% Moisture % |
| --- | --- | --- | --- | --- | --- | --- |
|  | Arrival Time (min.) | Peak Time (min.) | Stability Time (min.) | Departure Time (min.) |  |  |
| NFDM | 3.50 | 8.0 | 11.25 | 14.75 | 35 | 62.0 |
| BAKER'S CONCENTRATE | 2.75 | 8.0 | 11.75 | 14.50 | 35 | 63.8 |

The desirable characteristics of the bread provided using the inventive formulation can be seen from the following detailed description of functionality, i.e., various characteristics.

Mixing Requirements -- The new soy product exerts a measurable effect on the mixing characteristics of the dough which is attributable to its ascorbic acid content. In continuous mixing systems, ascorbic acid reduces the power requirements by acting as a reducing agent in the relative absence of atmospheric oxygen within the restricted mixing chamber. With conventional mixers, the availability of oxygen converts the ascorbic acid to dehydroascorbic acid, an oxidizing agent, which then acts the same as potassium bromate to give strength and stability to the dough. Comparative farinograph curves obtained with doughs containing equivalent increments of the new soy product and non-fat dry milk illustrate the improving effect of the former (see the Farinograph Pattern above).

Absorption -- Although the new product is capable of absorbing 1½ times its weight of water, and under normal circumstances, the absorption of the dough could be increased by 1½ times the percentage level at which the product is used, this change is not obligatory in order to obtain good quality bread because of the tolerances built-in by the use of calcium lactate and ascorbic acid. The prior art product required at least twice its weight of water in the formulation which would be beyond the tolerance limits of the additive package. When used in combination with whey solids, a 50—50 blend will give a slightly higher absorption than is obtained when nonfat dry milk is used as the sole additive. When a 40-60 blend of soy product and whey solids is used, the absorption will then equal that obtained with nonfat dry milk alone. The performance of the new product and nonfat dry milk are basically the same except the former requires 1.8 percent more absorption at the 3 percent additive level.

Machinability -- The machinability of the dough is favorably influenced by the new soy product from mixing to the final proofing stage. This is especially apparent at the moulder-panner and is attributed to the calcium lactate introduced into the formula.

Calcium lactate acts as a fermentation regulator, thereby "buffering" the dough in the same manner as does nonfat dry milk. Calcium lactate in dough disassociates to calcium and lactic acid. The active calcium, unlike calcium sulfate, mono-calcium phosphate, etc., which are inert "buffers," inhibits the production of carbon dioxide gas during the makeup of the dough. Excessive gassing, leading to bucky doughs, is quite often a problem during hot, humid weather conditions.

Experimental evidence indicates that calcium lactate acts upon the gluten giving additional machining properties by actually strengthening the gluten strands. Doughs evaluated by the extensograph showed that the new soy product, when compared to nonfat dry milk at the 3 percent additive level produced results that were as good as, or better than those obtained with nonfat dry milk.

The extensograph data of the two doughs are as follows:

|  | NFDM | NEW PRODUCT |
| --- | --- | --- |
| Energy (CM²) | 58.4 | 56.5 |
| Resistance | 420 | 540 |
| Extensibility | 60 | 75 |
| Ratio | 7.0 | 7.2 |
| Energy | The larger the factor the greater the dough strength. | |
| Resistance | Resistance to extension. | |
| Extensibility | The amount of dough can be extended or stretched. | |
| Ratio | The larger the ratio, the shorter the dough, conversely, the smaller the ratio the more the dough will flow. | |

The effect of nonfat dry milk, new soy product, and whey solids, respectively, on carbon dioxide production in dough as determined by means of a pressure meter is shown below.

Carbon Dioxide Pressure Development in Doughs
(3% Additive Level)

|  | Time | Nonfat Dry Milk | New Soy Product | Whey Solids |
| --- | --- | --- | --- | --- |
| Floor Time | 10 min. | 55 | 50 | 55 |
|  | 20 min. | 60 | 70 | 70 |
|  | 30 min. | 62 | 85 | 78 |
| Divider | 40 min. | 90 | 90 | 85 |
| Intermdiate Proof | 50 min. | 99 | 95 | 115 |
| Moulder-panner | 60 min. | 105 | 100 | 130 |

In the above tabulation, the units are gauge readings -- the higher the figure the more gas produced.

It will be noted that during the intermediate proof and at the moulder-panner gas production is less in the soy product doughs than in either the nonfat dry milk or whey solids doughs. The less gassy doughs permit closer sheeting without rupturing of the dough cells.

Loaf Volume -- The loaf volume obtained by the use of the soy product is equal to or better than that of bread made with nonfat dry milk by both continuous and conventional systems. This evaluation is based on the specific volume of the bread which is the ratio obtained by dividing the rapeseed displacement by the weight of the loaf. The average specific volume of the nonfat dry milk loaf was 4.95, as compared to 5.25 of the soy product loaf at the 3 percent additive level.

Part of this increase in specific loaf volume is attributable to the ascorbic acid which through its oxidative reaction further strengthens the dough in the oven. Furthermore, the calcium lactate appears in most instances to augment gluten lubrication by the shortening and emulsifiers, thereby adding to the volume increase.

Loaf Symmetry -- The new product contributes to good loaf symmetry whether it is used by itself or in a blend. This effect is attributable to the special processing of the soy flour component which, as a result, neither weakens the gluten that might cause key-holing, nor toughens the dough excessively and thereby avoids a wild break and shred, as is often the case with ordinary soy flours.

The calcium lactate, by improving dough strength as well as dough lubrication, and the ascorbic acid, with its conditioning effect on the dough, also contribute to better loaf symmetry as well as increased volume.

Crust Characteristics -- The soy product, either alone or in blends, produces good color both in the side walls and in the top crust. The special processing of the soy flour component lowers its carbohydrate content, thereby lessening the chance of excessive coloration in the oven when short production stoppages (one or two minutes) are encountered.

The calcium lactate and ascorbic acid components of the soy product contribute to strong sidewalls by their interaction with the gluten. The high protein content of the soy flour also adds strength to the sidewalls.

Grain and Texture -- The grain and texture, as well as the flavor of bread made with the new soy product compare favorably with those of nonfat dry milk bread. The specially processed soy flour component exhibits an improved flavor profile over ordinary soy flours. When the soy product is used as the sole protein additive, the resultant crumb color assumes a slightly creamy appearance. When it is used in the form of whey blends, however, it yields a crumb color that is as white as that obtained with nonfat dry milk.

Yield -- Because of the greater absorption capacity of the soy product as compared to nonfat dry milk, the former increases the yield or number of loaves obtained per batch of dough.

Blends with 50 or 60 percent of whey solids show an absorption that equals that of nonfat dry milk. Hence, the yield is, in this case, equivalent to that with nonfat dry milk. Since the soy product's absorption is substantially higher than that of commercially available soy flours, the baker is afforded an opportunity to adjust the soy-whey proportions in his blend to accommodate his own particular quality, yield and cost requirements. Conventional soy flours with their lower protein content do not provide him with the same flexibility. The possibility of using relatively more whey in a blend at absorption levels equal to that of nonfat dry milk permits the user to take maximum advantage of all the desirable qualities of whey solids (color, sheen, fine grain, flavor, etc.) and still gain the funtionality of the soy product without appreciably increasing his over-all ingredient costs.

Nutrition -- The new soy product can readily serve as a complete replacement for nonfat dry milk as it is higher in its protein and calcium contents, as is evident from the values set forth below:

PROTEIN

|  | % |
|---|---|
| Soy product | 52 |
| Nonfat dry milk | 34 |
| Whey solids | 12 |

CALCIUM CONTENT

|  | mg/lb. |
|---|---|
| Soy product | 8120 |
| Nonfat dry milk | 5993 |
| Whey solids | 2951 |
| Soy flour | 1226 |

It will be noted that in blends of 50 per cent whey solids and 50 per cent conventional soy flour, the calcium content is reduced to 2,088 mg per pound of ingredient, or to only about one-third that found in nonfat dry milk. By the same token, an equivalent blend using the new soy product instead of regular soy flour contributes 5,535 mg per pound of ingredient. This approximates very closely the amount contributed by an equal weight of nonfat dry milk.

By the use of the new soy product, bakers who prefer blends to straight additives can now produce bread with nutritional qualities that are practically equivalent to those obtained with nonfat dry milk. The minor differences in vitamin levels, principally of riboflavin, are readily adjusted by the use of appropriate enrichment tablets. Bakers are thus in a position to upgrade the quality of their bread by the use of the new soy product with whey solids without a corresponding increase in dough costs.

Ingredient Cost:

| New Product | $.1975/lb. |
|---|---|
| Whey Solids | .0850/lb. |
| New Product plus Whey Solids (50/50) | .1413/lb. |
| New Product plus Whey Solids (40/60) | .1300/lb. |
| Regular Soy plus Whey Solids | .14–.16/lb. |

-Continued

| Regular Soy plus Whey Solids plus NFDM | .17–.22/lb. |
|---|---|
| Regular Soy plus Whey Solids plus Gel. Corn | .17–.25/lb. |

Bakers interested in blends can produce blends having the same functional value as in NFDM by using 50 percent or 60 percent whey solids and 50 percent or 40 percent NEW PRODUCT at an approximate cost of .14 dollars per pound. This flexibility does not exist with conventional blends which also do not have the functional value of NFDM.

As indicated above, the calcium lactate is added as a buffering agent to provide a buffer capacity -- similar to that of nonfat dry milk. The lactate also exerts a retarding effect on the rate of carbon dioxide production during the make-up stage of the dough. This is particularly important when the temperature in the make-up areas exceeds 80° to 85°F. The calcium lactate also produces a somewhat lower pH value in the dough as compared with control doughs, thereby augmenting the effectiveness of any mold inhibitors used in the dough.

In actual baking tests, the new soy product had little effect on gas production during the first 30-minute period after the dough left the mixer, with the experimental dough producing the same amount of carbon dioxide gas as the control dough with nonfat dry milk as the additive; however, during the succeeding 30 minutes, which coincided with the make-up period, the soy product dough produced 10 per cent less gas than did the dough containing nonfat dry milk. Even though the improved soy product exhibits a greater buffering capacity than nonfat dry milk or any dairy blend currently being marketed, the proof time of the dough is not affected.

The calcium sulfate used in the improved soy product exerts a dual function: (a) It acts as a water conditioner, expecially in areas of hard water. Calcium sulfate tends to promote better dough fermentation where the water has a pH above 7. (b) It provides a source of calcium to balance the nutritional value of soy product. When combined with that of the calcium lactate, the total calcium content of the soy product is equivalent to that found in nonfat dry milk.

In some instances, it might be advisable to utilize other calcium providing salts such as calcium carbonate. However, we prefer calcium sulfate which not only provides an excellent source of calcium to provide a balanced nutritional value but also serves as a water conditioner, especially in the so-called hard water areas.

When used in continuous dough systems, the product's ascorbic acid content acts as a reducing agent and decreases the mixing requirements of the doughs. In conventional dough systems, on the other hand, ascorbic acid is quickly converted from a reducing agent to an oxidizing agent, dehydroascorbic acid, which acts to improve dough stability.

The new soy product is a cream-colored, free-flowing, nonhygroscopic powder with good stability. In bakery formulation, it increases absorption, thereby giving greater product yield and reducing product costs. It also imparts superior machining properties to the dough.

The food additives included in the new soy product serve to enhance the machinability of the dough by increasing dough stability and mixing tolerance. The calcium salts introduce a buffering system that is equal to or superior to that provided by nonfat dry milk, without, at the same time, causing an increase in the proof time of the dough. Additionally, the combination of calcium lactate and calcium sulfate present in the soy product helps to impart side wall strength to the baked loaf. This is essential to an adequate stackability of the bread on the grocery shelf, and also, when clear packaging films are used, to enhance the eye appeal of the product.

The tables below summarize some of the average chemical values that characterize commercial samples of the new soy product.

Amino Acid Analysis of New Soy Product[1]

| Amino Acid | g. Amino Acid/16g N |
| --- | --- |
| Lysine | 5.87 |
| Methionine | 1.20 |
| Cystine[2] | 1.48 |
| Threonine | 3.74 |
| Leucine | 7.25 |
| Isoleucine | 4.15 |
| Phenylalanine | 4.80 |
| Tyrosine | 3.38 |
| Valine | 4.49 |
| Tryptophan[3] | 1.30 |

[1] Spinco Amino Acid Analyzer (Ion-exchange resin chromatography)
[2] E. Schram, Biochem. J. 57:33 (1954)
[3] J. R. Spies and R. C. Chambers, Analytical Chem. 21:1249 (1949)

Vitamin and Mineral Analysis of New Soy Product

| | mcg/g |
| --- | --- |
| Niacin | 14.83 |
| Pantothenic acid | 11.17 |
| Pyridoxine | 3.99 |
| Thiamin | 3.66 |
| Folic acid | 2.79 |
| Riboflavin | 2.02 |
| Biotin | 0.48 |
| Calcium% | 1.71 |
| Phosphorus% | 0.70 |
| Potassium% | 2.38 |
| Sodium% | 0.10 |
| Magnesium% | 0.23 |
| Iron (ppm) | 74.00 |

Bacteriological Profile of New Soy Product

| | |
| --- | --- |
| E. coli | <10/g |
| Standard Plate Count (35° C) | 50,000/g Max. |
| Rope Spore Count | 50/10g/ Max. |
| Yeast and Mold Count | 50/g Max. |
| Coliforms | <100/g |
| Coagulase positive Staphylococcus | <20/g |
| Clostridium perfringens | <10/g |
| Salmonella | Negative in 50g. |
| Fecal Streptococcus | <10/g |

We claim:

1. In a bread formulation where flour, water, sugar, shortening and yeast or chemical leavening are augmented by about 1.5 percent to about 3 percent of non-fat dry milk, the improvement comprising the substitution for at least a part of the non-fat dry milk of an equivalent weight of a mixture consisting essentially of 87–89 percent soy flour characterized by a Nitrogen Solubility Index of not less than about 66 percent, 5–7 percent soy protein isolate, 0.25–0.5 percent ascorbic acid with the remainder of said formulation being edible calcium salts with at least 50 percent of said salts being calcium lactate.

* * * * *